United States Patent
Chang et al.

(10) Patent No.: US 10,866,897 B2
(45) Date of Patent: Dec. 15, 2020

(54) BYTE-ADDRESSABLE FLASH-BASED MEMORY MODULE WITH PREFETCH MODE THAT IS ADJUSTED BASED ON FEEDBACK FROM PREFETCH ACCURACY THAT IS CALCULATED BY COMPARING FIRST DECODED ADDRESS AND SECOND DECODED ADDRESS, WHERE THE FIRST DECODED ADDRESS IS SENT TO MEMORY CONTROLLER, AND THE SECOND DECODED ADDRESS IS SENT TO PREFETCH BUFFER

(71) Applicant: Samsung Electronics Co., Ltd., Suwon-si (KR)

(72) Inventors: Mu-Tien Chang, Santa Clara, CA (US); Dimin Niu, Sunnyvale, CA (US); Dongyan Jiang, San Jose, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 15/349,949

(22) Filed: Nov. 11, 2016

(65) Prior Publication Data
US 2018/0089087 A1    Mar. 29, 2018

Related U.S. Application Data

(60) Provisional application No. 62/400,048, filed on Sep. 26, 2016.

(51) Int. Cl.
*G06F 12/0862* (2016.01)
*G06F 12/0868* (2016.01)

(52) U.S. Cl.
CPC ...... *G06F 12/0862* (2013.01); *G06F 12/0868* (2013.01); *G06F 2212/214* (2013.01);
(Continued)

(58) Field of Classification Search
CPC ............ G06F 12/0862; G06F 12/0868; G06F 2212/6026; G06F 2212/6022;
(Continued)

(56) References Cited

U.S. PATENT DOCUMENTS 5,325,508 A * 6/1994 Parks .................. G06F 12/0884
365/49.1
5,699,548 A * 12/1997 Choudhury ......... G06F 12/0804
711/142

(Continued)

OTHER PUBLICATIONS

Creating storage class persistent memory with NVDIMM. Article [online]. Viking Technology, 2013 [retrieved on Jan. 8, 2018]. Retrieved from the Internet <https://www.flashmemorysummit.com/English/Collaterals/Proceedings/2013/20130814_T2_Sweere.pdf>.*

(Continued)

*Primary Examiner* — William B Partridge
*Assistant Examiner* — Chie Yew
(74) *Attorney, Agent, or Firm* — Lewis Roca Rothgerber Christie LLP (57) ABSTRACT

A method of storing data in a memory module including an in-module prefetcher, an in-module prefetch buffer, memory, and a memory controller, the method including sending address information from the in-module prefetcher to the memory controller and to the prefetch buffer, determining prefetch accuracy based on a comparison of the address information sent to the memory controller and the address information sent to the prefetch buffer, determining (Continued)

a prefetch mode based on the prefetch accuracy, and storing the data in the memory based on the prefetch mode.

26 Claims, 3 Drawing Sheets

(52) U.S. Cl.
CPC .. *G06F 2212/281* (2013.01); *G06F 2212/313* (2013.01); *G06F 2212/6022* (2013.01); *G06F 2212/6026* (2013.01)

(58) Field of Classification Search
CPC ......... G06F 2212/214; G06F 2212/281; G06F 2212/313
See application file for complete search history.

(56) References Cited

U.S. PATENT DOCUMENTS

| | | | | |
|---|---|---|---|---|
| 5,721,860 | A * | 2/1998 | Stolt | G06F 13/1694 365/230.01 |
| 5,941,981 | A * | 8/1999 | Tran | G06F 9/383 711/137 |
| 6,496,277 | B1 * | 12/2002 | Chapin | H04N 1/32358 358/1.16 |
| 6,496,905 | B1 * | 12/2002 | Yoshioka | G06F 12/0879 711/143 |
| 6,532,505 | B1 * | 3/2003 | Stracovsky | G06F 13/1605 710/15 |
| 6,571,318 | B1 * | 5/2003 | Sander | G06F 12/0862 711/137 |
| 6,976,147 | B1 * | 12/2005 | Isaac | G06F 12/0862 711/137 |
| 7,120,064 | B2 | 10/2006 | Lee et al. | |
| 8,127,081 | B2 | 2/2012 | Lee et al. | |
| 8,452,912 | B2 | 5/2013 | Lee et al. | |
| 9,146,928 | B1 | 9/2015 | Noveck | |
| 2002/0087801 | A1 * | 7/2002 | Bogin | G06F 12/0835 711/137 |
| 2005/0223175 | A1 * | 10/2005 | Hepner | G06F 12/0862 711/137 |
| 2006/0080501 | A1 * | 4/2006 | Auerbach | G06F 1/3221 711/112 |
| 2007/0233955 | A1 | 10/2007 | Luo et al. | |
| 2009/0063895 | A1 * | 3/2009 | Smith | G06F 3/0607 714/6.32 |
| 2009/0187714 | A1 * | 7/2009 | Lee | G06F 12/0862 711/137 |
| 2009/0300320 | A1 * | 12/2009 | Zhang | G06F 12/0862 711/213 |
| 2009/0310411 | A1 * | 12/2009 | Lee | G11C 8/12 365/185.11 |
| 2010/0125681 | A1 * | 5/2010 | Patel | G06F 1/3203 710/14 |
| 2011/0047313 | A1 | 2/2011 | Hui et al. | |
| 2012/0072698 | A1 * | 3/2012 | Unesaki | G06F 12/0246 711/207 |
| 2013/0275682 | A1 * | 10/2013 | Ramanujan | G06F 13/1684 711/122 |
| 2014/0173217 | A1 * | 6/2014 | Kalamatianos | G06F 12/0862 711/137 |
| 2014/0310478 | A1 * | 10/2014 | Dodson | G06F 12/0862 711/137 |
| 2015/0019798 | A1 | 1/2015 | Huang | |
| 2016/0077761 | A1 | 3/2016 | Stabrawa et al. | |
| 2016/0163376 | A1 | 6/2016 | Bains et al. | |
| 2017/0024322 | A1 * | 1/2017 | Pan | G06F 12/0862 |
| 2018/0074949 | A1 * | 3/2018 | Verrilli | H04L 47/38 |
| 2018/0285013 | A1 * | 10/2018 | Rajan | G06F 3/0613 |

OTHER PUBLICATIONS

DRAM. Microsoft Press. 2002. Microsoft Computer Dictionary, Fifth Edition (5th ed.). Microsoft Press, Redmond, WA, USA. (Year: 2002).*

* cited by examiner

BYTE-ADDRESSABLE FLASH-BASED MEMORY MODULE WITH PREFETCH MODE THAT IS ADJUSTED BASED ON FEEDBACK FROM PREFETCH ACCURACY THAT IS CALCULATED BY COMPARING FIRST DECODED ADDRESS AND SECOND DECODED ADDRESS, WHERE THE FIRST DECODED ADDRESS IS SENT TO MEMORY CONTROLLER, AND THE SECOND DECODED ADDRESS IS SENT TO PREFETCH BUFFER

CROSS-REFERENCE TO RELATED APPLICATION(S)

This application claims priority to, and the benefit of, U.S. Provisional Application 62/400,048, filed on Sep. 26, 2016 in the U.S. Patent and Trademark Office, the entire content of which is incorporated herein by reference.

FIELD

One or more aspects of embodiments according to the present invention generally relate to an improved flash-based memory module, and a method of operating the same.

BACKGROUND

In the field of memory storage, datacenters that store large amounts of memory seek to accomplish high capacity, high performance, low power usage, and low cost. Flash memory may be a viable candidate for datacenters, as flash memory, when compared to dynamic random-access memory (DRAM), is able to provide high capacity and efficient power usage at reduced cost. For example, flash memory is able to provide terabytes of storage per module, which is 10 times larger than what can be achieved using DRAM technology. Additionally, flash memory uses lower standby power.

Unfortunately, flash memory, when compared to DRAM, typically provides weaker performance while also having more limited endurance. For example, certain types of flash memory (e.g., LLNAND or Z-NAND) may have latency for read and write operations that is significantly longer than that achieved using DRAM technology. Furthermore, to make LLNAND memory byte-addressable, access granularity is 2 KB or 4 KB (as opposed to 64 B).

SUMMARY

Aspects of embodiments of the present disclosure are directed toward an improved flash-based memory module, and toward a method of operating the same.

According to an embodiment of the present invention, there is provided a method of storing data in a memory module including an in-module prefetcher, an in-module prefetch buffer, memory, and a memory controller, the method including sending address information from the in-module prefetcher to the memory controller and to the prefetch buffer, determining prefetch accuracy based on a comparison of the address information sent to the memory controller and the address information sent to the prefetch buffer, determining a prefetch mode based on the prefetch accuracy, and storing the data in the memory based on the prefetch mode.

The method may further include receiving the address information at an address history table of the in-module prefetcher, and detecting an access pattern based on the address history table.

Determining the prefetch mode may include determining at least one of stride, direction, granularity, prefetch time, and pause time using prefetch mode registers of the in-module prefetcher.

The determining at least one of the stride, the direction, the granularity, the prefetch time, and the pause time may be based on address history stored in the address history table and the determined prefetch accuracy.

The method may further include generating a prefetch address based on the stride, the direction, and the granularity.

The method may further include sending a request to the memory controller to trigger a prefetch operation using a prefetching scheduler of the in-module prefetcher based on the determined at least one of the stride, the direction, the granularity, the prefetch time, and the pause time.

The method may further include receiving the address information at an in-module write buffer and write controller module of the memory module, and determining at least one of a write back mode and a write back time based on the address information.

The write back mode may include an immediate write mode for writing information to the memory as soon as possible, or a coalesced write mode for combining multiple blocks of information from a write buffer in a single write to the memory.

Receiving the address information at the in-module write buffer and write controller module may include receiving the address information at a write address history table, and the determining at least one of the write back mode and the write back time may be further based on the write address history table.

The method may further include sending the determined write back mode or the determined write back time to a scheduler of the write buffer and write controller module, and using the scheduler to schedule writes from a write buffer to the memory based on the determined write back mode or the determined write back time.

According to another embodiment of the present invention, there is provided a memory module including a memory controller, an in-module prefetcher for sending requests to the memory controller to trigger a prefetch operation, an in-module prefetch buffer coupled to the in-module prefetcher and configured to receive data from the in-module prefetcher, an in-module write buffer for storing information to be written to memory, and an in-module write controller for scheduling writes from the write buffer to the memory.

The in-module prefetcher may include a plurality of prefetch mode registers for determining a prefetch mode of the memory module, the prefetch mode registers including at least one of a stride register, a direction register, a granularity register, a prefetch time register, and a pause time register.

The stride register may be configured to determine a sequential prefetching mode such that the in-module prefetcher is configured to access prefetch addresses sequentially, a stride prefetching mode such that the in-module prefetcher is configured to access prefetch addresses in an offset manner, or an auto prefetching mode such that the in-module prefetcher is configured to access prefetch addresses based on an address history and prefetch accuracy. Also, the direction register may be configured to determine an ascending mode such that the in-module prefetcher is configured to access prefetch addresses in an ascending order, a descending mode such that the in-module prefetcher is configured to access prefetch addresses in a descending order, or an auto mode such that the in-module prefetcher is configured to access prefetch addresses in a descending order or an ascending order based on the address history and prefetch accuracy. Also, the granularity register may be configured to determine a granularity that is a fixed granularity of a given size, or a granularity that is based on the address history and the prefetch accuracy. Also, the prefetch time register may be configured to determine a continuous prefetch mode such that the in-module prefetcher is configured to continuously perform prefetching, an incoming request mode such that the in-module prefetcher is configured to perform prefetching when there is an incoming request, a cache/prefetch miss mode such that the in-module prefetcher is configured to perform prefetching only upon cache or prefetch miss, or an auto mode such that the in-module prefetcher is configured to time prefetching based on the address history and the prefetch accuracy. Also, the pause time register may be configured to determine an always paused mode such that the in-module prefetcher is disabled, a never paused mode such that the in-module prefetcher is always enabled, a buffer capacity mode such that the in-module prefetcher is configured to be paused when the prefetch buffer is full, and an auto mode such that the in-module prefetcher is configured to be paused based on the address history and the prefetch accuracy.

The in-module prefetcher may include a prefetching scheduler for sending the requests to the memory controller according to information received from the prefetch mode registers.

The in-module write controller may include a plurality of write buffer registers including a write back mode register, and a write back time register.

The write back mode register may be configured to determine an immediate write mode such that the in-module write buffer and write controller module is configured to write information to memory of the memory module as soon as possible, a coalesced write mode such that the in-module write buffer and write controller module is configured to combine separate blocks of information into a single write to the memory, or an auto mode such that the memory module is configured to use a write address history table to determine whether to use the immediate write mode or the coalesced write mode.

When the write back mode register determines the coalesced write mode, the write back time register may be configured to determine a time for writing data to the memory based on time, based on a capacity of the in-module write buffer, or based on priority based on persistency of the data.

The memory module may further include a DRAM for enabling direct communication with the host, and for operating as a memory cache of the memory module, wherein the in-module prefetch buffer and the in-module write buffer are components of the DRAM.

According to yet another embodiment of the present invention, there is provided an NVDIMM-type module including memory, an in-module prefetch buffer, an in-module prefetcher for determining at least one of a stride, a direction, a granularity, a prefetch time, and a pause time, and for generating a prefetch address based on the at least one of a stride, a direction, a granularity, a prefetch time, and a pause time, and an in-module write buffer and write controller module for determining whether to write to the memory as soon as possible or to combine separate blocks of data into a single write to the memory, and for scheduling writes to the memory.

The NVDIMM-type module may further include a memory controller coupled to the memory, coupled to the in-module prefetch buffer, and coupled to the in-module prefetcher, wherein the memory controller includes the in-module write buffer and write controller module.

BRIEF DESCRIPTION OF THE DRAWINGS

These and other aspects of embodiments of the present invention will be appreciated and understood with reference to the specification, claims, and appended drawings wherein:

DETAILED DESCRIPTION

Aspects of embodiments of the present disclosure are directed toward an improved flash-based memory module, and toward a method of operating the same.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s)

as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the described embodiments.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As discussed above, flash-based memory may have certain advantages and disadvantages when compared to dynamic random-access memory (DRAM). When using flash-based memory, it may be shown that prefetching (i.e., transferring data from a main memory to a temporary storage for later use and quicker access) may be useful for certain applications (e.g., if a corresponding access pattern is predictable). For example prefetching used in connection with a Restricted Boltzmann Machine (RBM) or in connection with machine learning (e.g., the fully-connected layer of a convolutional neural network) may reduce latency by allowing quick access to multiple data words located on a common physical row in the memory. For example, if prefetch is always successful in obtaining the desired data, then read latency may be reduced to the order of nanoseconds by using prefetching, wherein the read latency may be computed by summing together the prefetch buffer latency, the controller latency, and the protocol overhead.

Accordingly, embodiments of the present invention provide for an architecture of a flash-based (e.g., LLNAND-based) memory module capable of fast, byte-addressable access while also mitigating long access latency and improving endurance. Furthermore, the flash-based memory module may be used in conjunction with a novel, improved memory interface protocol. Additionally, the architecture described herein may be used in conjunction with a Non-Volatile Dual In-line Memory Module (e.g., a NVDIMM-P LLNAND module, which is able to map both NAND and DRAM into a memory address space), or any other transaction-based LLNAND module (e.g., a Gen-Z LLNAND module, which is potentially a future standard transaction-based module that uses an asynchronous memory protocol).

Figure 1:
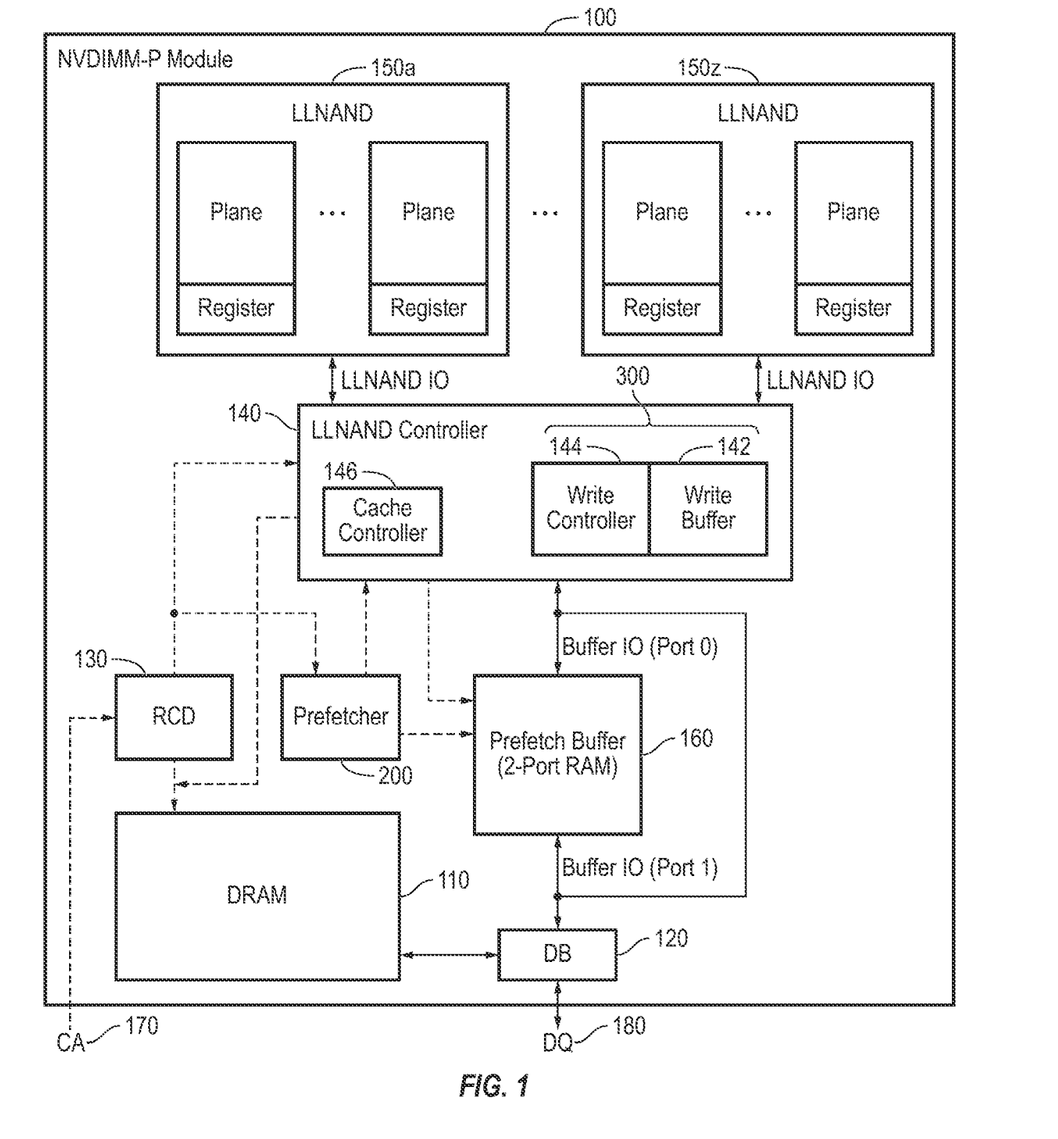
FIG. 1 is a block diagram depicting components of a flash-based memory module, according to an embodiment of the present invention.

FIG. 1 is a block diagram depicting components of a flash-based memory module, according to an embodiment of the present invention.

Figure 3:
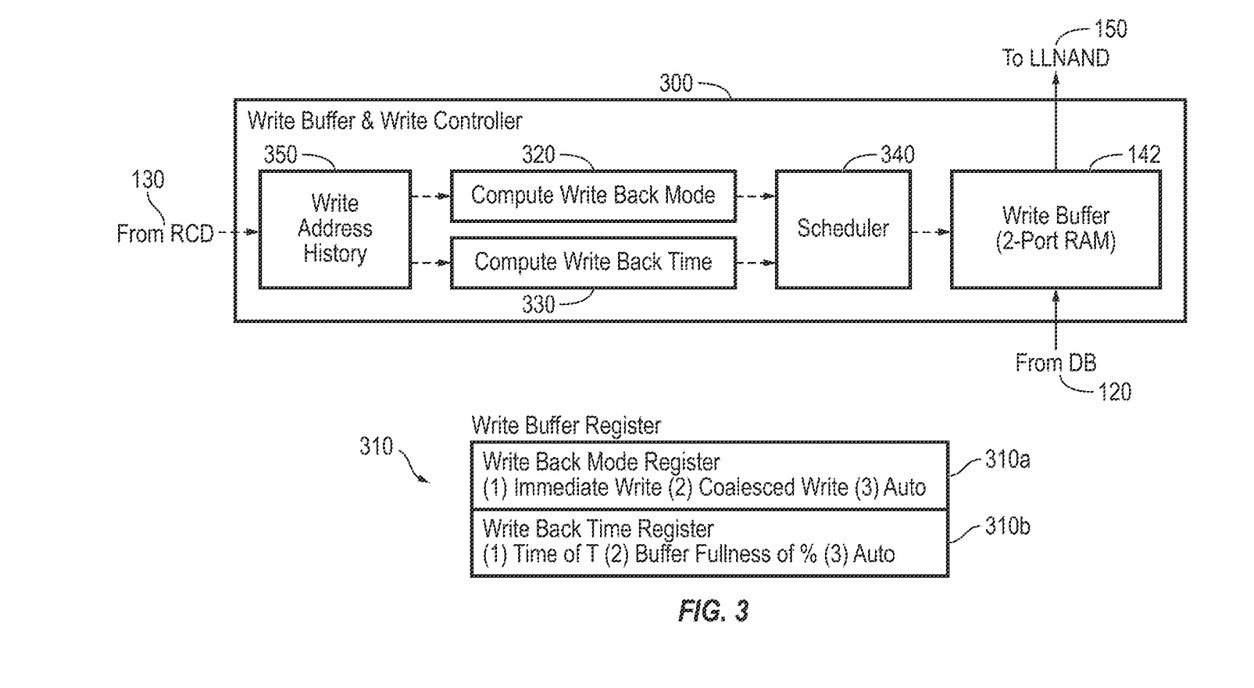
FIG. 3 is a block diagram of an in-module write buffer and write controller module of the flash-based memory module of FIG. 1, according to an embodiment of the present invention.

Referring to FIG. 1, a flash-based memory module (e.g., a NVDIMM-P module) 100 is shown. Although an NVDIMM-type module is described herein, other embodiments of the present invention may include a different type of DIMM, or a different type of flash-based memory module. Attention will be drawn to an in-module prefetcher 200 and an in-module prefetch buffer 160 (e.g., located within the module 100), which accomplish latency reduction. Attention will be also drawn to a write controller 144 and a write buffer 142 (e.g., an in-module write buffer and write controller module 300, as shown in FIG. 3), which enable in-module write coalescing to improve endurance of the module 100. These components and features will be described in greater detail with reference to FIGS. 2 and 3 below. Additionally, it should be noted that, although the present embodiment indicates that the write buffer 142 and the prefetch buffer 160 are separate modules, the write buffer 142 and prefetch buffer 160 may be part of a single module, or may instead be located on separate chips. In other embodiments, the write buffer 142 and the prefetch buffer 160 may be separate logical subdivisions of a DRAM buffer of the DRAM 110.

An address bus (e.g., a column address bus) 170, and a DQ bus 180 (e.g., a data bus) provide a memory interface that allows communication between the module 100 and a host. Additionally, a front-end DRAM 110 is included in the module 100 to enable direct communication with the host, and to serve as a memory cache. Connected to the DRAM 110 is a data buffer 120, which serves as a temporary storage that is able to communicate with the host. Also connected to the DRAM 110 is a registering clock driver (RCD) buffer 130, which is used to buffer information corresponding to the address information (e.g., column address information) 170 received from the host.

A memory controller (e.g., an LLNAND controller) 140 is provided as an interface to a memory/data storage (e.g., a back-end LLNAND data storage) 150, which is able to provide high-capacity memory that is sufficient for data storage. Accordingly, if the host wants to access data stored in the back-end LLNAND data storage 150, which may include a plurality of LLNAND modules 150a-150z, the host must first communicate with the LLNAND controller 140. Although an LLNAND controller 140 and corresponding LLNAND data storage 150 are described herein, other types of memory controllers and data storage of flash-based memory may be used in connection with other embodiments of the present invention.

Housed within the LLNAND controller 140 is the write buffer 142, which is able to temporarily store write data that will be transmitted to the back-end LLNAND data storage 150, and the write controller 144, which is able to schedule when and how to write data back to the LLNAND 150, as will be described further below with reference to FIG. 3. Also housed within the LLNAND controller 140 is a cache controller 146. Although the host is able to directly access the DRAM 110, in some instances, instead of a master that is for controlling the module 100 being included within the host, the LLNAND controller 140 may function as the master, in which case the LLNAND controller 140 may use the cache controller 146 therein to access the DRAM 110.

Also included in the module 100 is the prefetcher 200, and the prefetch buffer 160, which will be described with reference to FIG. 2.

Figure 2:
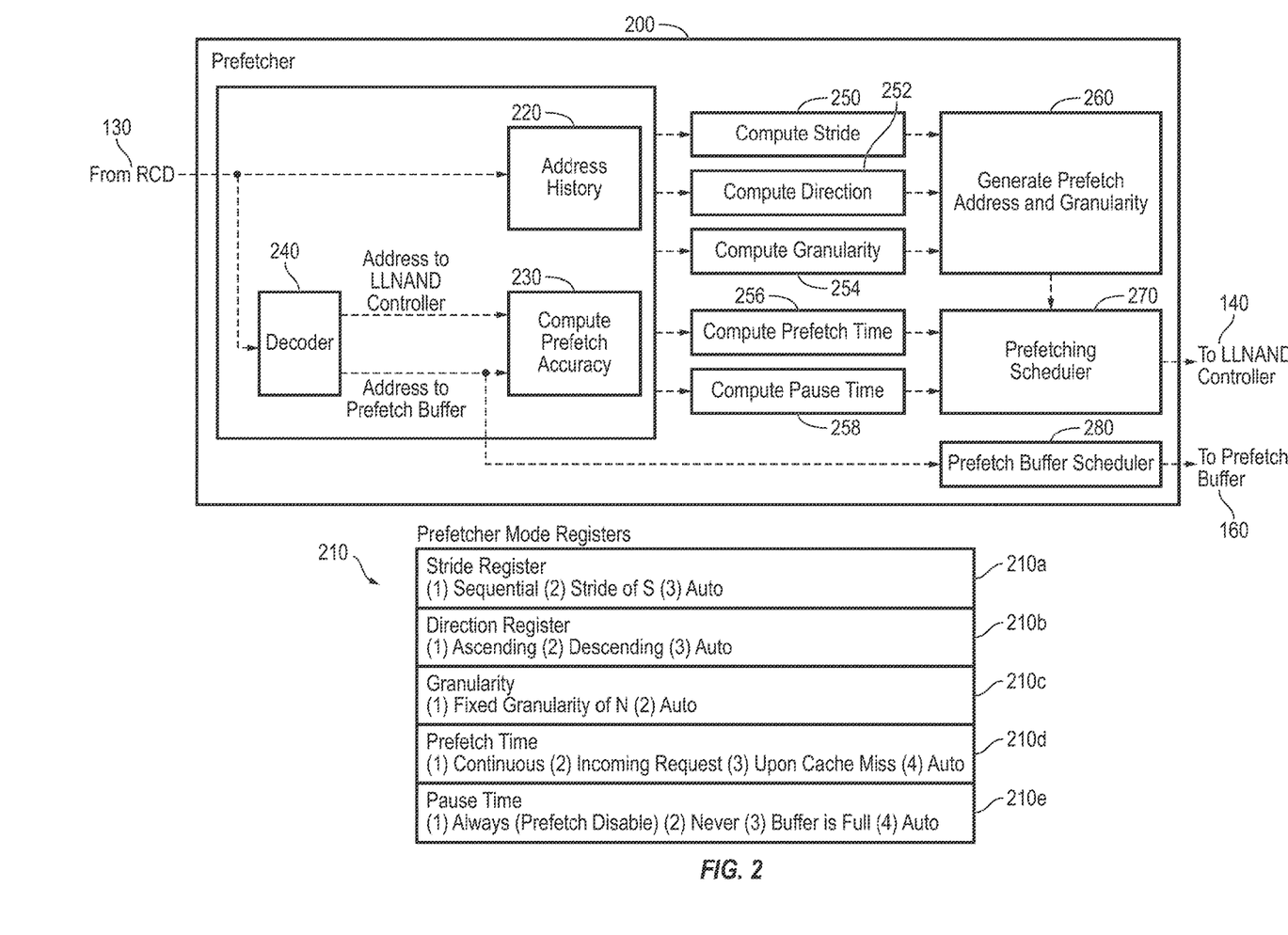
FIG. 2 is a block diagram indicating components of a prefetcher of the flash-based memory module of FIG. 1, according to an embodiment of the present invention.

FIG. 2 is a block diagram indicating components of a prefetcher of the flash-based memory module of FIG. 1, according to an embodiment of the present invention.

Referring to FIG. 2, the in-module prefetcher 200 of the present embodiment includes a plurality of prefetch mode registers 210, which enable the host/master to decide what type of prefetch mode the module 100 will use.

A first prefetch mode register may be referred to as a stride register 210a. The stride register 210a determines whether the prefetcher 200 will do a stride prefetching (e.g., will prefetch an address that is offset some distance "S" from a previous address), will do sequential prefetching (e.g., prefetch sequentially, or prefetch with a stride distance "S" that is equal to 1, in a sequential prefetching mode), or will perform an auto prefetching mode, which may be determined by the module 100 based on address history, which may be stored in an address history table 220 in the prefetcher 200, and prefetch accuracy 230, which may be computed within the prefetcher 200. Accordingly, the host can dictate whether sequential prefetching or stride prefetching is used such that the module 100 will continue to use the corresponding prefetch pattern until the host changes the type of prefetching indicated by the stride register 210a. Alternatively, the host can allow the module 100 to decide which prefetching pattern to use by programming the stride register 210a to correspond to the auto prefetching mode.

A second prefetch mode register may be referred to as a direction register 210b. The direction register 210b may dictate that the prefetch addresses are accessed in an ascending order (e.g., an ascending mode, where the prefetch address corresponds to a positive "S" for the stride distance), or that the prefetch addresses are accessed in a descending order (e.g., a descending mode, where the prefetch address corresponds to a negative "S" for the stride distance). Accordingly, when the direction register 210b indicates a descending order, the host will dictate that the prefetch addresses are fetched in a descending order, and when the direction register 210b indicates an ascending order, the host will dictate that the prefetch addresses are fetched in an ascending order. Additionally, the direction register 210b may indicate an auto mode, such that the direction in which the prefetch addresses are accessed may be determined by the module 100 (e.g., based on the address history 220 and the computed prefetch accuracy 230).

A third prefetch mode register may be referred to as a granularity register 210c. The granularity register 210c may dictate that the granularity is a fixed granularity, which may be fixed at a multiple of 4 KB, may dictate that the granularity is a fixed granularity of "N," where "N" may be any size (e.g., 2 KB), or may dictate use of an auto mode, such that the granularity may be determined by the module 100 (e.g., based on the address history 220 and computed prefetch accuracy 230).

A fourth prefetch mode register may be referred to as a prefetch time register 210d. The prefetch time register 210d may determine when the module 100 performs the prefetching. As a first option, the prefetch time register 210d enables continuous prefetching in a continuous prefetch mode, wherein the prefetching remains continuous regardless of the computed prefetch accuracy 230. As a second option, the prefetch time register 210d may dictate that the module 100 performs prefetching only when there is an incoming request received from the host. As a third option, the prefetch time register 210d may determine that the module 100 prefetches only when there is a prefetch miss or cache miss (e.g., a DRAM cache miss corresponding to the DRAM 110 of the module 100). As a fourth option, the prefetch time register 210d may enable an auto mode (e.g., the module 100 may determine when to prefetch based on the address history 220 and the computed prefetch accuracy 230).

A fifth prefetch mode register may be referred to as a pause time register 210e that is configured to define the prefetch pause time. That is, the pause time register 210e may indicate when the module 100 should stop prefetching.

For example, as a first option, the host/master can set the pause time register 210e such that prefetch is disabled, and is therefore never performed (e.g., the prefetcher 200 is always paused). As a second option, the host can set the pause time register 210e such that the prefetch occurs regardless of circumstances (e.g., the prefetcher 200 is never paused). As a third option, the pause time register 210e may be set such that the prefetch operation is paused when the prefetch buffer 160, which may be a 2-port random-access memory (RAM), is full, and may be unpaused once the prefetch buffer 160 has a sufficient amount of available capacity. As a fourth option, the pause time register 210e may set the pause time to an auto mode such that the module 100 determines the pause time (e.g., based on the address history 220 and the computed prefetch accuracy 230).

Accordingly, by using the described registers 210, the prefetch options can be determined by the host, or can instead be determined by the module 100.

The prefetcher 200 may receive information corresponding to the address information 170 from the RCD buffer 130 of the module 100. The prefetcher 200 may include a decoder 240 that is able to decode the information received from the RCD 130, and that is able to separately send the decoded address information to the LLNAND controller 140 and the prefetch buffer 160 (e.g., via prefetch buffer scheduler 280). The separate decoded address information (i.e., the decoded address information sent to the LLNAND controller 140 and the decoded address information sent to the prefetch buffer 160) may be compared with each other to enable computation of the prefetch accuracy 230. Accordingly, the prefetch accuracy effectively serves as feedback information sent to the prefetch buffer 160 to enable the prefetch buffer 160 to adjust and improve its prefetch policy/prefetch mode based on the completed prefetch accuracy 230.

Accordingly, the prefetcher 200 is able to detect the access pattern by using the prefetch accuracy 230 and the address history obtained from an address history table 220. The prefetcher 200 is also able to use the settings of the stride register 210a, the direction register 210b, and the granularity register 210c to respectively compute the stride 250, compute the direction 252, and compute the granularity 254, and to thereby generate prefetch addresses and granularity 260 to be sent to a prefetching scheduler 270.

The prefetcher 200 is also able to use prefetch accuracy 230 along with the address history 220, along with the settings of the prefetch time register 210d and the pause time register 210e, to compute prefetch time 256 and to compute prefetch pause time 258. The prefetch time and the prefetch pause time may also be sent to the prefetching scheduler 270. Based on the information corresponding to stride, direction, granularity, prefetch time, and pause time, the prefetching scheduler 270 is able to send information in the form of requests to the LLNAND controller 140 to trigger prefetch, and to enable the LLNAND controller 140 to decide what to read from the LLNAND 150.

Additionally, when a prefetch hit is detected, meaning that the desired data is found in the prefetch buffer 160, the prefetch buffer scheduler 280 may simply directly access the prefetch buffer 160, thereby obviating the need to access the LLNAND 150 for the desired data.

The prefetch address is also sent to a prefetch buffer scheduler 280, which is configured to determine both when and what to read from the prefetch buffer 160. The prefetch buffer 160 can be accessed in 64 B granularity, and can be configurable by special function registers. It should be noted that the prefetch buffer 160 may be part of the physical prefetch mode registers 210, which may be separate and independent of the LLNAND 150.

FIG. 3 is a block diagram of an in-module write buffer and write controller module of the flash-based memory module of FIG. 1, according to an embodiment of the present invention.

Referring to FIG. 3, the in-module write buffer and write controller module 300 of the present embodiment can have two corresponding write buffer registers 310. A first write buffer register may be referred to as a write back mode register 310a that is configured to define the write back mode, and a second write buffer register may be referred to as the write back time register 310b that is configured to define the write back time.

With respect to the write back mode register 310a, a first option for the write back mode is to allow for an immediate write, meaning that whenever information is contained in the write buffer 142, then the LLNAND controller 140 may write the information back to the LLNAND 150 as soon as possible. For example, the LLNAND controller 140 may write 64 B of information from the write buffer 142 back to LLNAND 150 effectively immediately. Although this immediate write mode increases availability of the write buffer 142, it should be noted that LLNAND write bandwidth, which requires 2 KB write bandwidth even when writing information containing only 64 B, is wasted, which may thereby negatively affect the endurance of the LLNAND 150.

The write back mode register 310a may also choose to employ a second option to allow for a coalesced write. Although the granularity for the LLNAND 150 is in the 2 KB range, granularity for front end access (e.g., access to the DRAM 110) is only 64 B. Accordingly, by allowing for a coalesced write, by combining multiple blocks of information from the write buffer 142, each of the blocks of information consisting of 64 B, to thereby generate a single LLNAND write (e.g., of about 2 KB), a total number of writes to the LLNAND 150 may be reduced, thereby extending endurance and lifetime of the LLNAND 150. Accordingly, by employing the coalesced write option, an amount of wasted LLNAND write bandwidth is reduced. However, the availability of the write buffer 142 may be decreased. That is, because a plurality of 64 B writes may be queued up and merged before a write is performed, a 64 B block of information may remain in the write buffer 142 for an extended period of time before it is coalesced with a sufficient number of other blocks of information to be written back to the LLNAND 150.

A third option employed by the write back mode register 310a may be an auto mode, in which the module 100 can decide which write back mode to use (e.g., the immediate write mode or the coalesced write mode). For example, the module 100 may use a write address history table 350 in the in-module write buffer and write controller module to determine a best write back mode 320, whether it is the immediate write mode or the coalesced write mode.

The second register may be referred to as a write back time register 310b, which is used to configure the write back time. The write back time register 310b is used in conjunction with the coalesced write mode described above. If the write back mode register 310a chooses to use the coalesced write option, it is theoretically possible to wait in perpetuity without writing the information from the write buffer 142 back to the LLNAND 150. Accordingly, to avoid a scenario in which data is never written back to LLNAND 150, and by using the write back time register 310b, a threshold time or event corresponding to a maximum wait time may be used when the coalesced write option is employed.

The determined write back time 330 may be determined according to time, a capacity/level of fullness of the write buffer 142, or priority based on persistency. Because NAND technology has the benefit of preserving persistent data, the write back time register 310b may enforce persistency by determining that information labeled as persistent receives priority or passes through the write buffer 142 to be written back to the LLNAND 150. Accordingly, and for example, a write back to the LLNAND 150 may be scheduled according to the first occurrence of the following: when a 64 B block of information has stayed in the write buffer 142 for more than a given time; when the write buffer 142 reaches a given buffer capacity (e.g., based on a percentage of fullness of the write buffer 142 in a buffer capacity mode); or when priority to the write back is assigned based on persistency.

Additionally, it should be noted that either or both of the prefetch buffer 160 and the write buffer 142 can be instantiated as components of the DRAM 110 of the module 100 in other embodiments. Furthermore, it should be noted that the write buffer 142 may be separate from the write controller 144 in other embodiments. In the present embodiment, the in-module write buffer and write controller module 300 includes the write address history table 350. Accordingly, the write buffer 142 can use the write address history table 350 as a basis for determining the write back mode 320 and the write back time 330. Upon determining the write back mode 320 and the write back time 330, information corresponding thereto may be fed into a scheduler 340 in the in-module write buffer and write controller module 300. The scheduler 340 may use this information to determine when the write buffer 142 writes back to the LLNAND 150, what information is written back to the LLNAND 150, and the order in which the information is written back to the LLNAND 150.

Accordingly, the embodiments described above provide a flash-based memory module that is able to sufficiently store large amounts of memory while achieving reduced latency by adjusting a prefetch policy based on an access pattern determined from address history and prefetch accuracy, while also achieving improved endurance by selectively scheduling writes to memory based on write address history.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method of storing and retrieving data from, a memory module comprising an in-module prefetcher, an in-module prefetch buffer, a flash memory, and a memory controller, all of which being integrated into the memory module on a same printed circuit board (PCB), the method comprising:
    decoding first address information by the in-module prefetcher and sending the decoded first address information from the in-module prefetcher to the memory controller;
    decoding second address information by the in-module prefetcher and sending the decoded second address information from the in-module prefetcher to the in-module prefetch buffer;
    computing prefetch accuracy by comparing the decoded first address information and the decoded second address information with each other;
    adjusting a prefetch mode based on using the prefetch accuracy as feedback information to adjust the prefetch mode; and
    retrieving the data from the flash memory based on the prefetch mode.

2. The method of claim 1, further comprising receiving either the decoded first address information or the decoded second address information at an address history table of the in-module prefetcher, and
    detecting an access pattern based on the address history table.

3. The method of claim 2, wherein determining the prefetch mode comprises determining at least one of stride, direction, granularity corresponding to a read size of the flash memory and a cache entry size, prefetch time, and pause time using prefetch mode registers of the in-module prefetcher.

4. The method of claim 3, wherein the determining at least one of the stride, the direction, the granularity, the prefetch time, and the pause time is based on address history stored in the address history table and the determined prefetch accuracy.

5. The method of claim 3, further comprising generating a prefetch address based on the stride, the direction, and the granularity.

6. The method of claim 3, further comprising sending a request to the memory controller to trigger a prefetch operation using a prefetching scheduler of the in-module prefetcher based on the determined at least one of the stride, the direction, the granularity, the prefetch time, and the pause time.

7. The method of claim 1, further comprising determining a write back mode comprising an immediate write mode for writing information as the data to the flash memory as soon as possible, or a coalesced write mode for combining multiple blocks of information as the data from a write buffer in a single write to the flash memory.

8. The method of claim 1, further comprising:
    sending a determined write back mode or a determined write back time to a scheduler of an in-module write buffer and write controller module; and
    using the scheduler to schedule writes from a write buffer to the flash memory based on the determined write back mode or the determined write back time.

9. A memory module comprising:
    a flash memory;
    a memory controller;
    an in-module prefetcher comprising a decoder configured to decode information for sending requests to the memory controller to trigger a prefetch operation;
    an in-module prefetch buffer coupled to the in-module prefetcher and configured to receive data from the decoder of the in-module prefetcher;

an in-module write buffer for storing information to be written to the flash memory; and an in-module write controller for scheduling writes from the write buffer to the flash memory, wherein the memory module is configured to:

decode first address information by the in-module prefetcher and send the decoded first address information from the in-module prefetcher to the memory controller;

decode second address information by the in-module prefetcher and send the decoded second address information from the in-module prefetcher to the in-module prefetch buffer;

compute prefetch accuracy by comparing the decoded first address information and the decoded second address information with each other; and adjust a prefetch mode based on using the prefetch accuracy as feedback information to adjust the prefetch mode.

10. The memory module of claim 9, wherein the in-module prefetcher comprises a plurality of prefetch mode registers for determining a prefetch mode of the memory module, the prefetch mode registers comprising at least one of:

a stride register;
a direction register;
a granularity register;
a prefetch time register; and
a pause time register.

11. The memory module of claim 9, wherein the in-module prefetcher comprises a plurality of prefetch mode registers for determining a prefetch mode of the memory module, the prefetch mode registers comprising at least one of:

a stride register that is configured to determine a sequential prefetching mode such that the in-module prefetcher is configured to access prefetch addresses sequentially, a stride prefetching mode such that the in-module prefetcher is configured to access prefetch addresses in an offset manner, or an auto prefetching mode such that the in-module prefetcher is configured to access prefetch addresses based on an address history and prefetch accuracy;

a direction register that is configured to determine an ascending mode such that the in-module prefetcher is configured to access prefetch addresses in an ascending order, a descending mode such that the in-module prefetcher is configured to access prefetch addresses in a descending order, or an auto mode such that the in-module prefetcher is configured to access prefetch addresses in a descending order or an ascending order based on the address history and the prefetch accuracy;

a granularity register that is configured to determine a granularity that is a fixed granularity of a given size, or a granularity that is based on the address history and the prefetch accuracy;

a prefetch time register that is configured to determine a continuous prefetch mode such that the in-module prefetcher is configured to continuously perform prefetching, an incoming request mode such that the in-module prefetcher is configured to perform prefetching when there is an incoming request, a cache/prefetch miss mode such that the in-module prefetcher is configured to perform prefetching only upon cache or prefetch miss, or an auto mode such that the in-module prefetcher is configured to time prefetching based on the address history and the prefetch accuracy; or a pause time register that is configured to determine an always paused mode such that the in-module prefetcher is disabled, a never paused mode such that the in-module prefetcher is always enabled, a buffer capacity mode such that the in-module prefetcher is configured to be paused when a prefetch buffer is full, and an auto mode such that the in-module prefetcher is configured to be paused based on the address history and the prefetch accuracy.

12. The memory module of claim 10, wherein the in-module prefetcher comprises a prefetching scheduler for sending the requests to the memory controller according to information received from the prefetch mode registers.

13. The memory module of claim 9, wherein the in-module write controller comprises a plurality of write buffer registers comprising:

a write back mode register; and
a write back time register.

14. The memory module of claim 13, wherein the write back mode register is configured to determine:

an immediate write mode such that the in-module write buffer and write controller module is configured to write the information to the flash memory of the memory module as soon as possible;

a coalesced write mode such that the in-module write buffer and write controller module is configured to combine separate blocks of information into a single write to the flash memory; or an auto mode such that the memory module is configured to use a write address history table to determine whether to use the immediate write mode or the coalesced write mode.

15. The memory module of claim 14, wherein, when the write back mode register determines the coalesced write mode, the write back time register is configured to determine a time for writing data to the flash memory based on time, based on a capacity of the in-module write buffer, or based on priority based on persistency of the data.

16. An NVDIMM-type module comprising:

a flash memory;
an in-module prefetch buffer;
an in-module prefetcher, comprising a decoder configured to send a first decoded address to a memory controller to trigger a prefetch operation and send a second decoded address information to the in-module prefetch buffer, for determining at least one of a stride, a direction, a granularity, a prefetch time, and a pause time, and for generating a prefetch address based on the at least one of the stride, the direction, the granularity, the prefetch time, and the pause time; and an in-module write buffer and write controller module for determining whether to write to the flash memory as soon as possible or to combine separate blocks of data into a single write to the flash memory, and for scheduling writes to the flash memory, wherein the NVDIMM-type module is configured to:

decode first address information by the in-module prefetcher and send the decoded first address information from the in-module prefetcher to the memory controller;

decode second address information by the in-module prefetcher and send the decoded second address information from the in-module prefetcher to the in-module prefetch buffer;

compute prefetch accuracy by comparing the decoded first address information and the decoded second address information with each other; and adjust a prefetch mode based on using the prefetch accuracy as feedback information to adjust the prefetch mode.

17. The NVDIMM-type module of claim 16, wherein the memory controller is coupled to the flash memory, coupled to the in-module prefetch buffer, and coupled to the in-module prefetcher, wherein the memory controller comprises the in-module write buffer and the write controller module.

18. A method of storing and retrieving data from, a memory module comprising an in-module prefetcher, an in-module prefetch buffer, a flash memory, and a memory controller integrated into the memory module, the method comprising:
- decoding first address information by the in-module prefetcher and sending the decoded first address information from the in-module prefetcher to the memory controller;
- decoding second address information by the in-module prefetcher and sending the decoded second address information from the in-module prefetcher to the in-module prefetch buffer;
- computing prefetch accuracy by comparing the decoded first address information and the decoded second address information with each other;
- adjusting a prefetch mode based on using the prefetch accuracy as feedback information to adjust the prefetch mode;
- retrieving the data from the flash memory based on the prefetch mode;
- receiving either the decoded first address information or the decoded second address information at an in-module write buffer and write controller module of the memory module; and
- determining a selection of at least one of a write back mode from a plurality of write back modes and a write back time from a plurality of write back times based on the decoded first address information or the decoded second address information.

19. The method of claim 18, further comprising receiving either the decoded first address information or the decoded second address information at an address history table of the in-module prefetcher, and
- detecting an access pattern based on the address history table.

20. The method of claim 19, wherein determining the prefetch mode comprises determining at least one of stride, direction, granularity corresponding to a read size of the flash memory and a cache entry size, prefetch time, and pause time using prefetch mode registers of the in-module prefetcher.

21. The method of claim 20, wherein the determining at least one of the stride, the direction, the granularity, the prefetch time, and the pause time is based on address history stored in the address history table and the determined prefetch accuracy.

22. The method of claim 20, further comprising generating a prefetch address based on the stride, the direction, and the granularity.

23. The method of claim 20, further comprising sending a request to the memory controller to trigger a prefetch operation using a prefetching scheduler of the in-module prefetcher based on the determined at least one of the stride, the direction, the granularity, the prefetch time, and the pause time.

24. The method of claim 18, wherein the write back mode comprises an immediate write mode for writing information as the data to the flash memory as soon as possible, or a coalesced write mode for combining multiple blocks of information as the data from a write buffer in a single write to the flash memory.

25. The method of claim 18, wherein receiving the decoded first address information or the decoded second address information at the in-module write buffer and write controller module comprises receiving the decoded first address information or the decoded second address information at a write address history table; and
- wherein the determining at least one of the write back mode and the write back time is further based on the write address history table.

26. The method of claim 18, further comprising:
- sending the determined write back mode or the determined write back time to a scheduler of the write buffer and write controller module; and
- using the scheduler to schedule writes from a write buffer to the flash memory based on the determined write back mode or the determined write back time.

* * * * *